(12) United States Patent
Noll et al.

(10) Patent No.: US 10,565,739 B2
(45) Date of Patent: Feb. 18, 2020

(54) AUTOMATED ICON ACCESSIBILITY ASSESSMENT ALGORITHM AND TOOL

(71) Applicant: CERNER INNOVATION, INC., Kansas City, KS (US)

(72) Inventors: Aaron Noll, Overland Park, KS (US); Eric Wilson, Lee's Summit, MO (US); Mayur Rajendran, Overland Park, KS (US); Alex Lende, Kansas City, MO (US); Anna-Therese Fowler, Leawood, KS (US); Jay Vaglio, Mission, KS (US)

(73) Assignee: CERNER INNOVATION, INC.

( * ) Notice: Subject to any disclaimer, the term of this patent is extended or adjusted under 35 U.S.C. 154(b) by 162 days.

(21) Appl. No.: 15/858,133

(22) Filed: Dec. 29, 2017

(65) Prior Publication Data

US 2019/0206087 A1 Jul. 4, 2019

(51) Int. Cl.
| | |
|---|---|
| *G06K 9/00* | (2006.01) |
| *G06T 7/90* | (2017.01) |
| *G06T 11/00* | (2006.01) |
| *G06T 11/60* | (2006.01) |
| *G06F 3/048* | (2013.01) |

(52) U.S. Cl.
CPC ............. *G06T 7/90* (2017.01); *G06F 3/048* (2013.01); *G06T 11/001* (2013.01); *G06T 11/60* (2013.01); *G06T 2200/24* (2013.01); *G06T 2207/10024* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 6,118,427 | A  * | 9/2000 | Buxton | G06F 3/0481 345/629 |
| 6,954,215 | B2 * | 10/2005 | Noyle | G06T 15/503 345/592 |
| 7,352,917 | B2 * | 4/2008 | Kondo | G06T 7/20 348/222.1 |
| 8,543,927 | B1 * | 9/2013 | McKinley | H04M 1/72552 715/753 |
| 9,678,648 | B2 * | 6/2017 | Hwang | G06F 3/0485 |
| 10,114,799 | B2 * | 10/2018 | Tainsh | G06T 11/60 |
| 2016/0247249 | A1 * | 8/2016 | Harris | G06T 11/40 |
| 2018/0040144 | A1 * | 2/2018 | Li | G06F 16/958 |

* cited by examiner

*Primary Examiner* — Soo Jin Park
(74) *Attorney, Agent, or Firm* — Shook, Hardy & Bacon L.L.P.

(57) ABSTRACT

Systems, methods, and computer-readable media for providing tools to validate color contrast are provided. To do so, three discrete color check processes are performed to ensure a user is able to identify when an icon is at risk of being inaccessible by some users. A border score considers each pixel at the edge of an icon compared to the background in which it is placed. An area score considers each discrete pixel of an icon compared to the background in which it is placed. A grid score considers a subdivision of an icon compared to the background in which it is placed. Using each of these three independent process, a summative score is provided. The summative score categories the icon into a risk level. Depending on the risk level, the icon may need to be refined to ensure it becomes more accessible.

20 Claims, 9 Drawing Sheets

AUTOMATED ICON ACCESSIBILITY ASSESSMENT ALGORITHM AND TOOL

BACKGROUND

Governments and other regulatory entities instill broad and strict requirements and guidelines on products to ensure quality. Healthcare software is not exempt from these requirements and guidelines. The concepts that must be validated vary and may include human factors and abilities. For example, one concept is color contrast. Color contrast itself helps ensure items found on a user interface are visible, distinguishable, and understood by all users, including those utilizing assistive visual technologies (e.g. magnification) or those that are colorblind.

Current tools that assist in validating color contrast rely on contrast ratio calculation. However, the contrast ratio calculation used by these tools is only one part of accessibility for iconography. Additionally, current tools provide pre-determined color ratio thresholds which do not take into consideration changing requirements (based on country, application type, etc.). Furthermore, in the case of icons, complexity (e.g. gradients of color) can make checking all the various colors on the border of the icon challenging and time consuming. For example, for a typical healthcare software application having approximately five thousand five hundred icons, it would take approximately ten minutes to check accessibility for each icon, or more than five months for a single employee assigned to the task.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing tools to validate color contrast. More particularly, three discrete color check processes are performed to ensure a user is able to identify when an icon is at risk of being inaccessible by some users. A border score considers each pixel at the edge of an icon compared to the background in which it is placed. An area score considers each discrete pixel of an icon compared to the background in which it is placed. A grid score considers a subdivision of an icon compared to the background in which it is placed. Using each of these three independent process, a summative score is provided. The summative score categorizes the icon into a risk level. Depending on the risk level, the icon may need to be refined to ensure it becomes more accessible.

BRIEF DESCRIPTION OF THE DRAWINGS

Embodiments are described in detail below with reference to the attached drawing figures, wherein.

DETAILED DESCRIPTION

Figure 1:
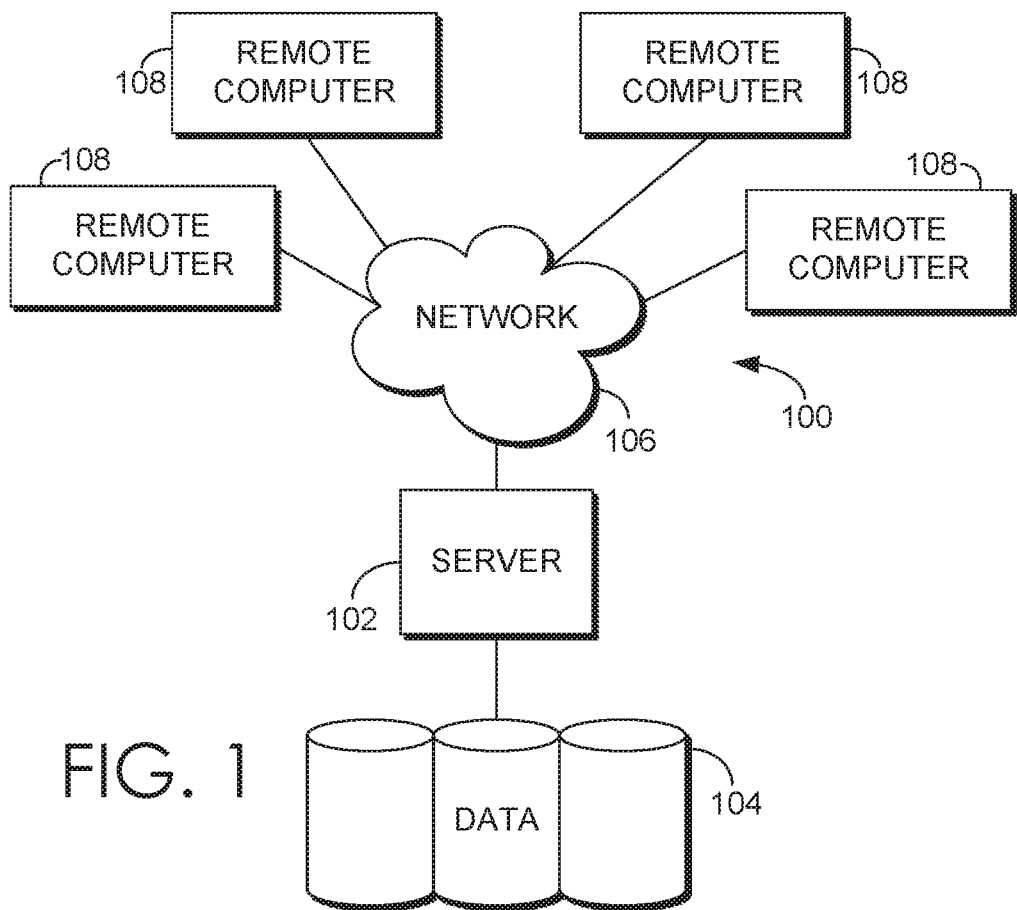
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

As noted in the Background, governments and other regulatory entities instill broad and strict requirements and guidelines on products to ensure quality. Healthcare software is not exempt from these requirements and guidelines. The concepts that must be validated vary and may include human factors and abilities. For example, one concept is color contrast. Color contrast itself helps ensure items found on a user interface are visible, distinguishable, and understood by all users, including those utilizing assistive visual technologies (e.g. magnification) or those that are colorblind.

Current tools that assist in validating color contrast rely on contrast ratio calculation. However, the contrast ratio calculation used by these tools is only one part of accessibility for iconography. Additionally, current tools provide pre-determined color ratio thresholds which does not take into consideration changing requirements (based on country, application type, etc.). Furthermore, in the case of icons, complexity (e.g. gradients of color) can make checking all the various colors on the border of the icon challenging and time consuming. For example, for a typical healthcare software application having approximately five thousand five hundred icons, it would take approximately ten minutes to check accessibility for each icon, or more than five months for a single employee assigned to the task.

Embodiments of the present disclosure relate to providing tools to validate color contrast. More particularly, three discrete color check processes are performed to ensure a user is able to identify when an icon is at risk of being inaccessible by some users. A border score considers each pixel at the edge of an icon compared to the background in which it is placed. An area score considers each discrete pixel of an icon compared to the background in which it is placed. A grid score considers a subdivision (e.g., sixteen 4×4 discrete chunks) of an icon compared to the background in which it is placed. Using each of these three independent process, a summative score is provided. The summative score categories the icon into a risk level. Depending on the risk level, the icon may need to be refined to ensure it becomes more accessible.

In embodiments, the tools enable a user to adjust thresholds of risk for changing requirements or regulations, which may vary from country to country or based on the type of application (e.g., medical software). This flexibility ensures guidelines are met for any country or type of application.

In embodiments, the tools may be utilized to assist in design decisions for the general user interface. For example, icon accessibility is influenced by the context in which it is applied. An icon that is one hundred percent red in color could be accessible on a white table row. However, if the table row is selected, it may turn another color (e.g., blue).

The same red icon may become inaccessible (e.g. color blind users may lose visibility of where the icon is coated). In this instance, the tools allow for an icon to be scored against one or as many colors as configured. This enables a user to upload icons and understand background colors that can influence the accessibility of the icon more or less than other background colors.

In embodiments, the tools enable a user to upload as many icons as the user selects. Additionally, the user may configure as many background colors as the user desires. Each of these features provides significant time advantages and allows for a broader understanding of the risks for the icon (e.g. assessing hundreds of background colors for a single icon).

In some embodiments, in addition to providing a risk level for the icon, the user can hover over a respective risk level and the icon itself highlights which part(s) of the icon was assessed and is at risk. In other words, the tools do not just provide the risk level but actually informs the user where on the icon is at the particular risk level.

Accordingly, one embodiment of the present disclosure is directed to a system for providing an icon accessibility tool. The system includes a processor; and a computer storage medium storing computer-usable instructions that, when used by the processor, cause the processor to: convert an image containing an icon into arrays of red green blue alpha (RGBA) values; determine an area score for each icon for each background color; determine a border score for each icon; divide the image into arrays of RBGA values corresponding to grid squares; and determine a grid score for each grid square of the image.

In another embodiment, the present disclosure directed to a computerized method for providing an icon accessibility tool. The method includes: converting an icon, for each icon in an image, into arrays of red blue green alpha (RGBA) values; determining an area score for each icon for each background color; determining a border score for each icon; dividing the image into arrays of RBGA values corresponding to grid squares; determining a grid score for each grid square of the image; and providing a composite score to a user, the composite score considering the area score, the border score, and the grid score for each icon of the image to evaluate a risk of each icon of the image not being accessible to the corresponding background.

In yet another embodiment, the present disclosure is directed to one or more computer storage media having computer-executable instructions embodied thereon that, when executed by a computer, causes the computer to perform operations to provide an icon accessibility tool. The operations include: converting an icon, for each icon in an image, into arrays of red green blue alpha (RGBA) values; dividing the image into arrays of RBGA values corresponding to grid squares; determining an array of coordinates for opaque pixels of an icon; excluding all pixels below an opaque alpha threshold; identifying a relative luminance between opaque pixels and a background color; providing an area score, the area score being a percentage of identified opaque pixels with the relative luminance above a minimum contrast ratio; determining an array of coordinates of border pixels by finding pixels that are not transparent, an outer pixel, or have a transparent neighboring pixel; identifying a relative luminance between opaque border pixels and a background color; providing a border score, the border score being the percentage of identified opaque border pixels with the relative luminance above a minimum contrast ratio, wherein pixels that are not transparent are pixels that have an alpha value that is above an transparent alpha threshold; filtering out grid squares that are entirely composed of transparent pixels; for any remaining grid squares, identifying a percentage of opaque pixels greater than an area threshold; providing a grid score, the grid score being the percentage of grid squares that have the percentage of opaque pixels greater than the area threshold; and Providing a composite score to a user, the composite score considering the area score, the border score, and the grid score for each icon of the image to evaluate a risk of each icon of the image not being accessible when placed upon the corresponding background color.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, data cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and providers' offices. Providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like.

The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

In some embodiments, remote computers 108 comprise computing-devices that are part of a cloud-computing platform. For example, the control server 102 might operate in a computer network 106 hosted as part of a cloud service (e.g., AMAZON WEB SERVICES, GOOGLE HOSTING, IBM BLUEMIX). In some embodiments, a remote computer 108 is associated with a health records data source such as an electronic health record (EHR) system of a hospital or medical organization, a health information exchange EHR, insurance provider EHR, ambulatory clinic EHR, or patient-sensor, or other data source, and facilitates accessing data of the source and communicating the data to control server 102 and/or other computing devices on a cloud computing platform, including other remote computers 108.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
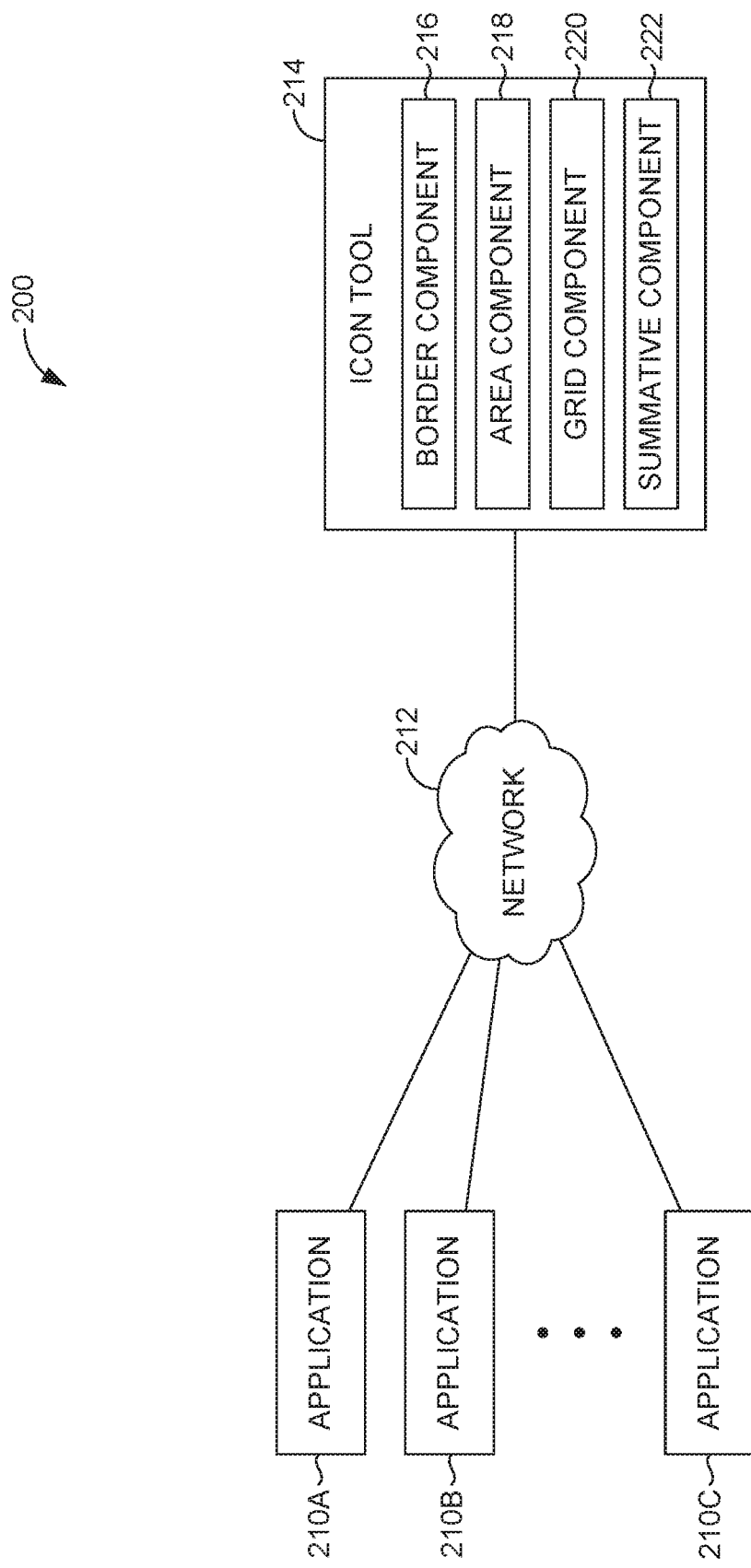
FIG. 2 is an exemplary system architecture suitable for use in implementing embodiments of the present invention.

Turning now to FIG. 2, an exemplary framework of an accessibility system 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The accessibility system 200 may be implemented via any type of computing device, such as computing device 100 described above with reference to FIG. 1, for example.

The accessibility system 200 generally operates to provide an automated icon accessibility algorithm and tool. In other words, the accessibility system 200 can receive as input, an icon or an image of icons from applications 210A-210C, and automatically determine which icon or icons need to be refined to meet accessibility guidelines. In this way, an application having icons can have the icons quickly and automatically analyzed to confirm they meet accessibility guidelines. Additionally, because thresholds utilized to apply the various algorithms can be adjusted as need to meet varying accessibility guidelines, the icons can be quickly and automatically analyzed to confirm they meet varying guidelines (to comply with differing guidelines from different agencies or organizations or to ensure guidelines that may change from time to time are met by icon usage in current or legacy applications).

As shown in FIG. 2, the accessibility system 200 includes, among other components not shown, applications 210A-210C, network 212, and icon tool 214. It should be understood that the accessibility system 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network 212, which may include, without limitation, one or more local area networks (LANs) and/or wide area networks (WANs). Such networking environments are commonplace in offices, enterprise-wide computer networks, intranets, and the Internet. It should be understood that any number of applications or icon tools may be employed within the accessibility system 200 within the scope of the present disclosure. Each may comprise a single device or multiple devices cooperating in a distributed environment. For instance, components of the icon tool 214 may be provided via multiple devices arranged in a distributed environment that collectively provide the functionality described herein. In other embodiments, a single device may provide the functionality of multiple components of the icon tool 214 or accessibility system 200. For example, a single device may provide the application and the icon tool. Additionally, other components not shown may also be included within the network environment.

Generally, the applications 210A-210C include images comprising icons or icons. A composite score for the applications 210A-210C (which is generally provided on a per image or per icon basis) can be determined by utilizing the icon tool 214. The icon tool 214 may determine which icon needs refinement in order to comply with a particular accessibility guideline. For clarity, an image refers to the container for the icon (a two-dimensional bitmap sometimes referred to as the pixel grid). Typically, the icon fills the image in order for the image to be used with icon tool 214. In this regard, the icon is independent from any other content, and the bounding box for the icon is the size of the image.

Icon tool 214 is generally configured to determine an accessibility of an icon or image, such as one corresponding to applications 210A-210C. As mentioned briefly, icon tool 214 may comprise a border component 216, an area component 218, a grid component 220, and a summative component 222. Each of the border component 216, the area component 218, the grid component 220, and the summative component 222 may utilize various algorithm, as described in more detail below, that are dependent on configurable thresholds. The configurable thresholds enable the algorithms to dynamically adjust based on changes in accessibility guidelines.

Initially, icon tool 214 may convert an icon, for each icon in an image into arrays of RGBA values which is utilized by border component 216 and area component 218. Icon tool may additionally divide an image into arrays of RGBA values corresponding to grid squares. Although illustrated as a server in FIG. 2, icon tool 214 may also be utilized as a web application via the server or a native application on the client-machine (applications 210A-210C).

Border component 216 generally determines a border score for each image or icon. To do so, border component 216 initially determines an array of coordinates of border pixels by finding pixels that both: 1) not transparent; and 2) either a pixel at the edge of the image boundary or have a transparent neighboring pixel. A relative luminance is identified, by border component 216, between opaque border pixels and a background color. Border component 216 provides the border score which is a percentage of identified opaque border pixels with the relative luminance above a minimum contrast ratio (as described herein, can be configured in accordance with a particular accessibility guideline). For clarity, pixels that are not transparent are pixels that have an alpha value that is above a transparent alpha threshold, which as described herein, can be configured in accordance with a particular accessibility guideline.

Area component 218 generally determines an area score for each image or icon. To do so, area component 218 initially determines an array of coordinates for opaque pixels of an icon. All pixels below an opaque alpha threshold are excluded by area component 218. As described herein, the opaque alpha threshold can be configured in accordance with a particular accessibility guideline. Area component 218 identifies a relative luminance between opaque pixels and a background color. An area score that is a percentage of identified opaque pixels with the relative luminance above a minimum contrast ratio is provided by area component 218.

Grid component 220 generally determines a grid score for each image or icon. To do so, grid component 220 initially filters out grid squares that are entirely composed of transparent pixels. For any remaining grid squares, grid component 220 identifies a percentage of opaque pixels greater than an area threshold. The area threshold can be configured in accordance with a particular accessibility guideline, as described herein. A grid score that is the percentage of grid squares that have the percentage of opaque pixels greater than the area threshold is provided by the grid component 220.

Summative component 222 generally provides a composite score to a user. The composite score considers the area score, the border score, and the grid score for each icon of the image to evaluate a risk of each icon of the image not being accessible to the corresponding background. Summative component 222 may provide composite scores for the icon with multiple varying backgrounds to enable the user to select the most accessible icon in accordance with the background having the lowest risk composite score.

Figure 3:
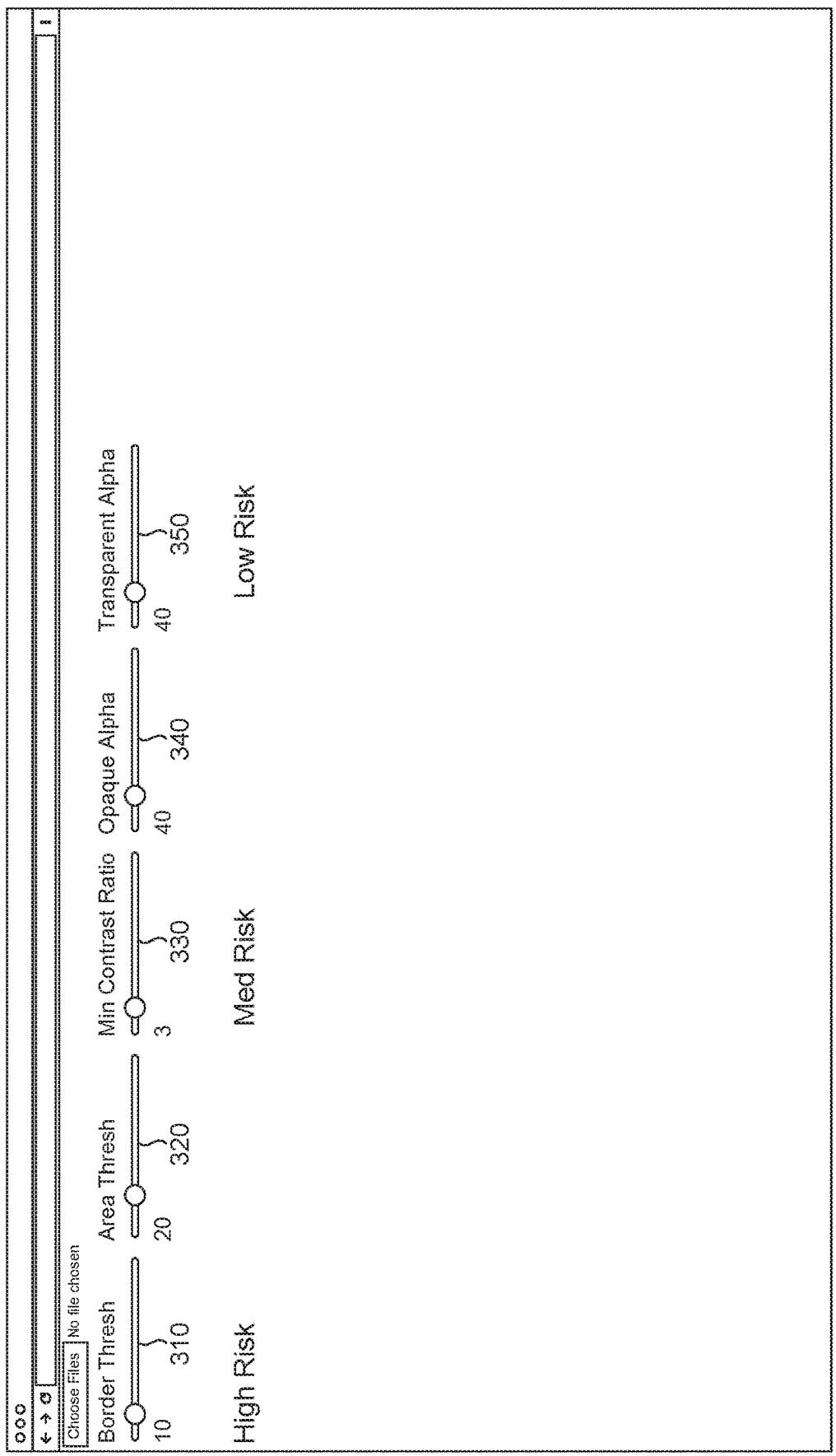
FIGS. 3-5 are illustrative screen displays in accordance with embodiments of the present invention.
Figure 4:
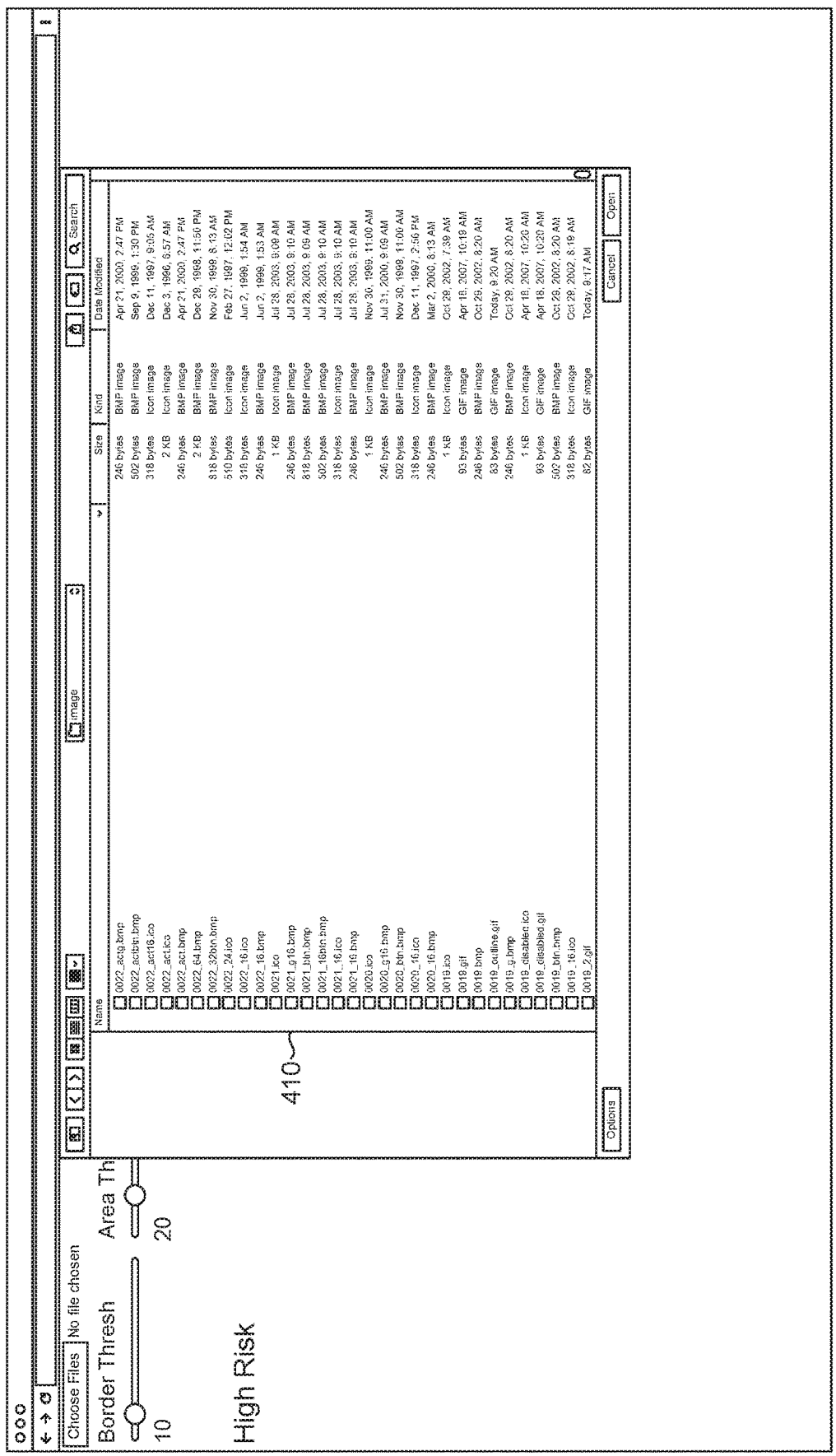
Figure 5:
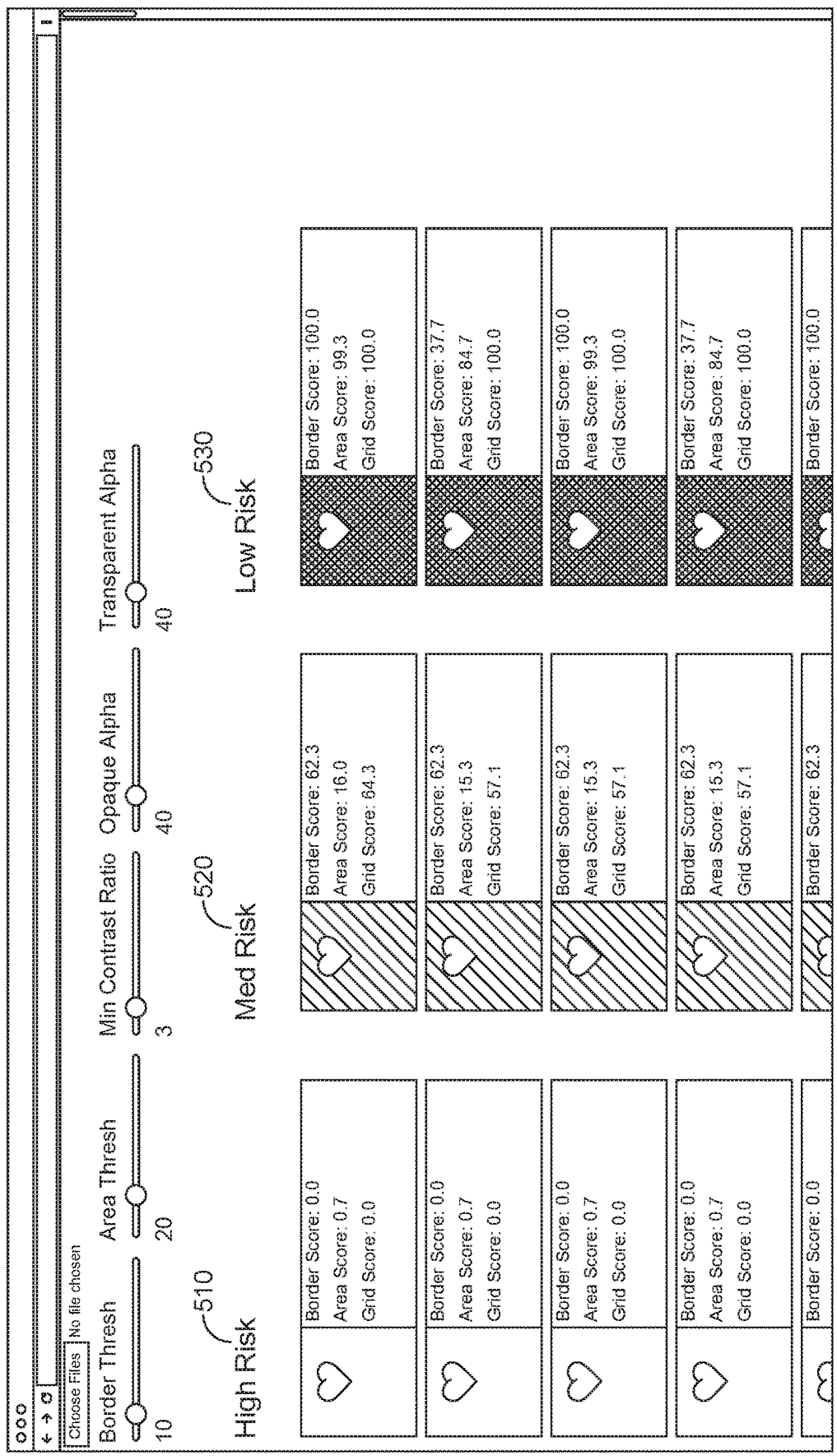

In FIGS. 3-5, illustrative screen displays are provided, in accordance with embodiments of the present invention. FIG. 3 illustrates an exemplary accessibility tool 300 for configuring thresholds to adjust for accessibility guidelines. As illustrated, border threshold 310, area threshold 320, minimum contrast ratio 330, opaque alpha 340, and transparent alpha 350 can each be adjusted to comply with a particular accessibility guideline. Referring now to FIG. 4, once the appropriate thresholds have been adjusted, an image or icon 410 can be selected via the accessibility tool 400. Upon selection, and referring to FIG. 5, a composite score (corresponding to a ranking) along with border score, area score, and grid score is provided for the icon with various background colors. As illustrated, a list of high risk icons 510, a list of medium risk icons 520, and a list of low risk icons 530 is provided.

Figure 6:
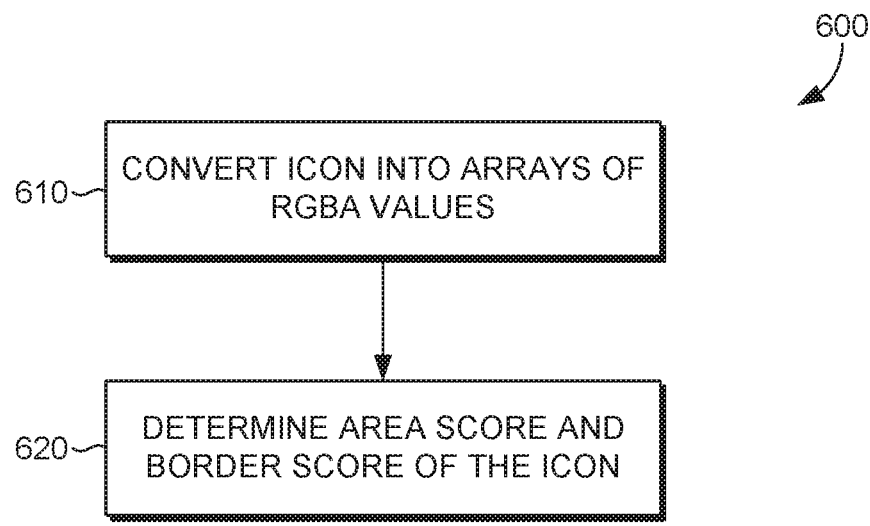
FIG. 6-10 are flow diagrams of methods in accordance with embodiments of the present invention.

Turning now to FIG. 6, a flow diagram is provided illustrating a method 600 for for pre-assessment for area score and border score algorithms, in accordance with embodiments of the present invention. Method 600 may be performed by any computing device (such as computing device described with respect to FIG. 1) with access to an accessibility system (such as the one described with respect to FIG. 2) or by one or more components of the accessibility system.

Initially, at step 610, an icon is converted into arrays of RBGA values.

At step 620, an area score and a border score are determined for the icon.

Figure 7:
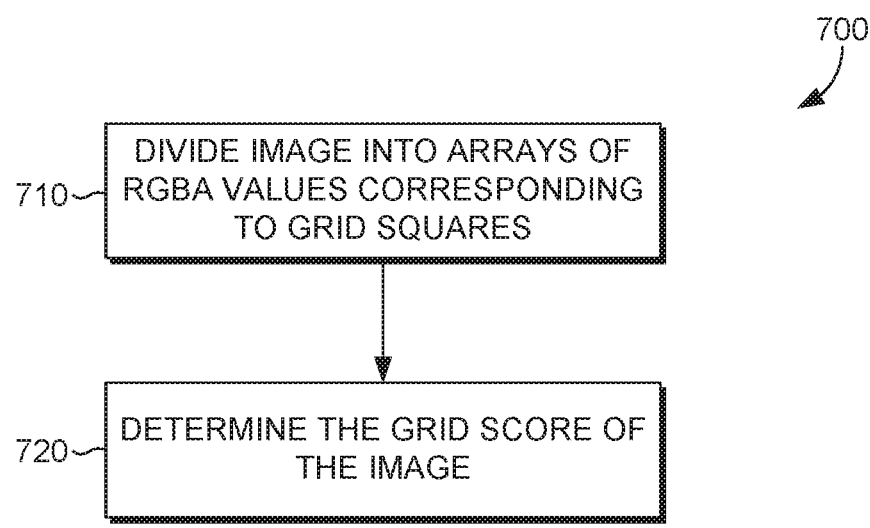

In FIG. 7, a flow diagram is provided illustrating a method 700 for pre-assessment for grid score algorithm, in accordance with embodiments of the present invention. Method 700 may be performed by any computing device (such as computing device described with respect to FIG. 1) with access to an accessibility system (such as the one described with respect to FIG. 2) or by one or more components of the accessibility system.

Initially, at step 710, an image is divided into arrays of RGBA values corresponding to grid squares.

At step 720, the grid score of the image is determined.

Figure 8:
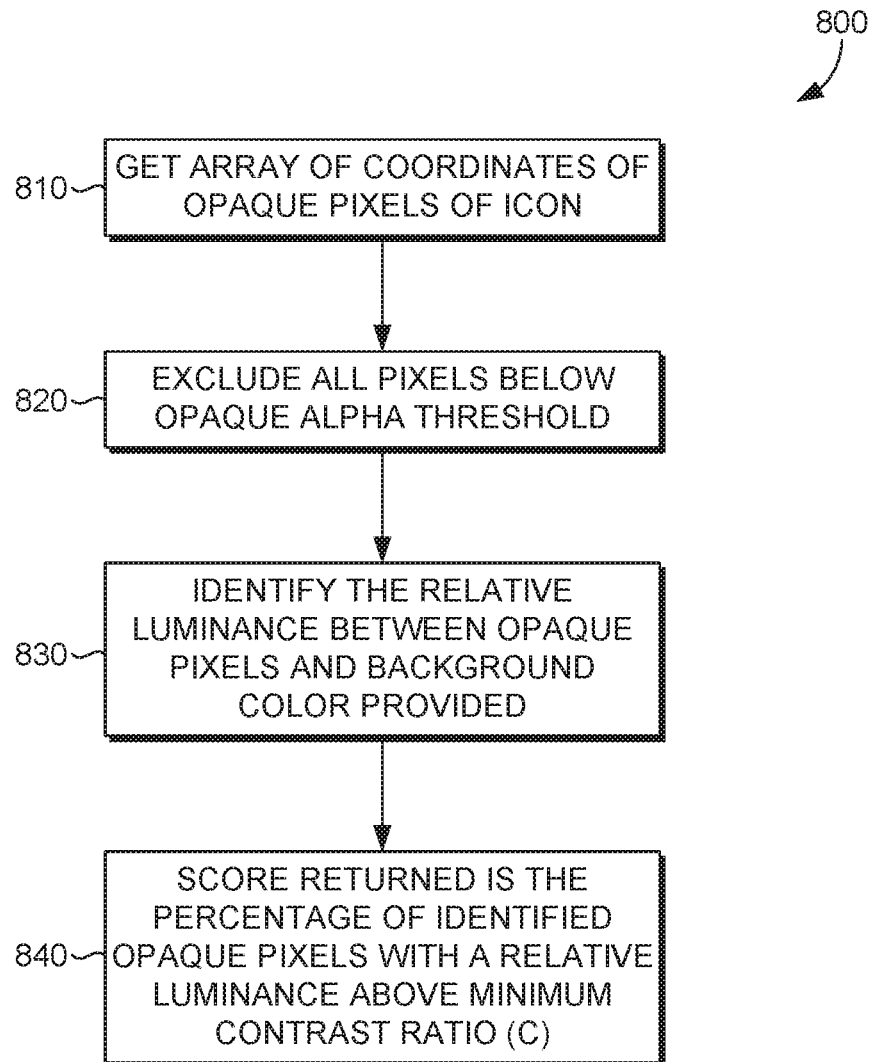

Turning now to FIG. 8, a flow diagram is provided illustrating a method 800 for for utilizing the area score algorithm to determine the area score of an icon, in accordance with embodiments of the present invention. Method 800 may be performed by any computing device (such as computing device described with respect to FIG. 1) with access to an accessibility system (such as the one described with respect to FIG. 2) or by one or more components of the accessibility system.

Initially, at step 810, an array of coordinates is determined for opaque pixels of an icon.

At step 820, all pixels below an opaque alpha threshold are excluded.

At step 830, a relative luminance is identified between opaque pixels and a background color.

At step 840, an area score is provided. The area score is a percentage of identified opaque pixels with the relative luminance above a minimum contrast ratio.

Figure 9:
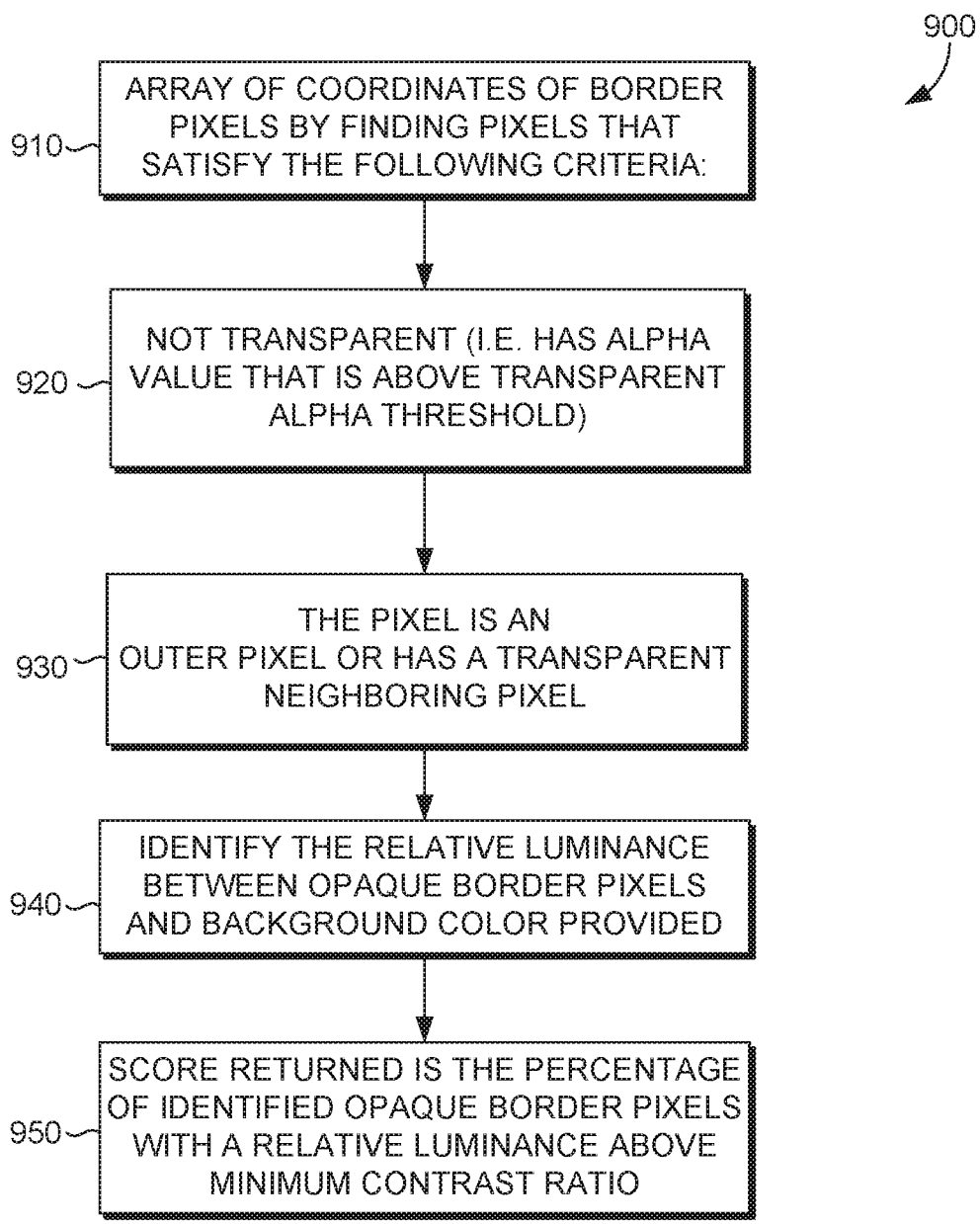

In FIG. 9, a flow diagram is provided illustrating a method 900 for utilizing the border score algorithm to determine the border score of an icon, in accordance with embodiments of the present invention, in accordance with embodiments of the present invention. Method 900 may be performed by any computing device (such as computing device described with respect to FIG. 1) with access to an accessibility system (such as the one described with respect to FIG. 2) or by one or more components of the accessibility system.

Initially, at step 910, an array of coordinates of border pixels is determined by finding pixels that: 1) are not transparent, at step 920; and 2) an outer pixel or have a transparent neighboring pixel, at step 930. An outer pixel refers to any pixel within the first or last column or row of the image.

At step 940, a relative luminance is identified between opaque border pixels and a background color.

At step 950, a border score is provided. The border score is the percentage of identified opaque border pixels with the relative luminance above a minimum contrast ratio, wherein pixels that are not transparent are pixels that have an alpha value that is above an transparent alpha threshold.

Figure 10:
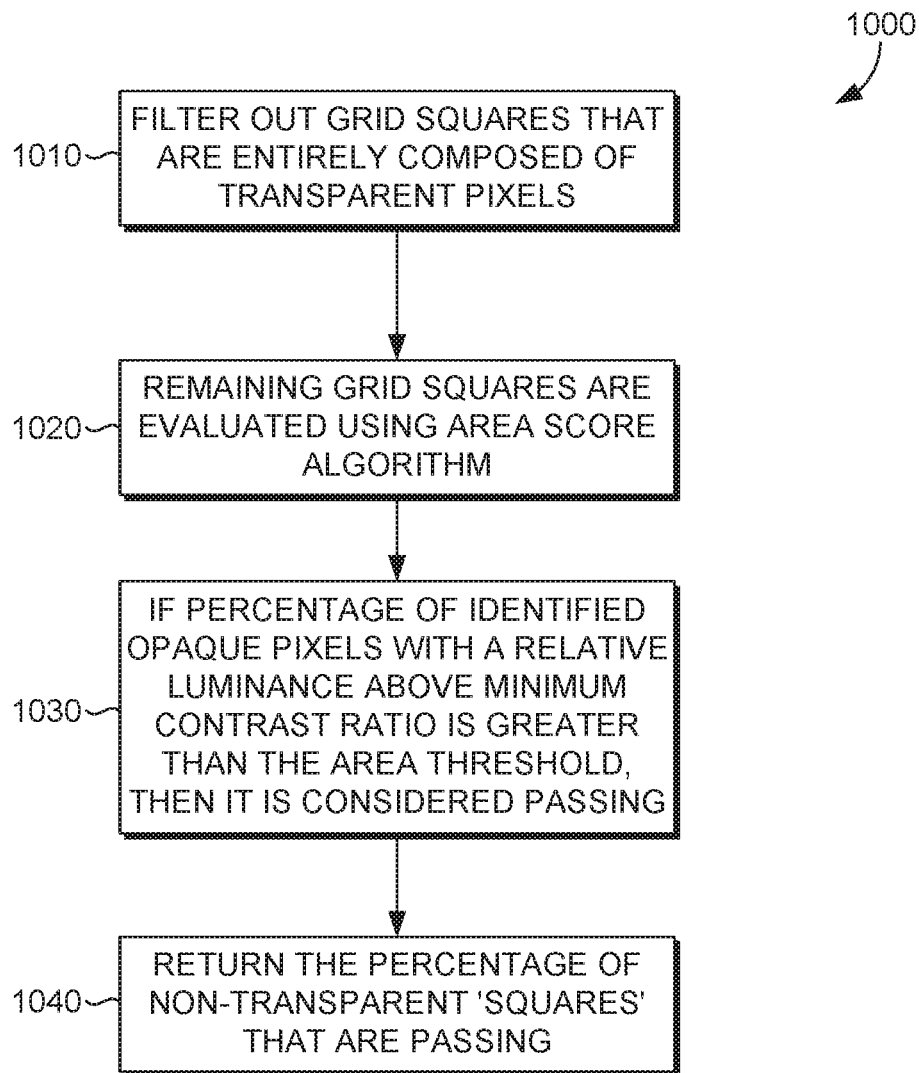

Turning now to FIG. 10, a flow diagram is provided illustrating a method 400 for for utilizing the grid score algorithm to determine the grid score of an icon, in accordance with embodiments of the present invention. Method 1000 may be performed by any computing device (such as computing device described with respect to FIG. 1) with access to an accessibility system (such as the one described with respect to FIG. 2) or by one or more components of the accessibility system.

Initially, at step 1010, grid squares that are entirely composed of transparent pixels are filtered out.

At step 1020, any remaining grid squares are evaluated using the grid score algorithm.

At step 1030, if percentage of opaque pixels is greater than the area threshold for a given grid square, it passes the grid score algorithm.

At step 1040, the percentage of non-transparent grid squares that pass is returned as the grid score.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

The invention claimed is:

1. A system for providing an icon accessibility tool, the system comprising:
    a processor; and
    a computer storage medium storing computer-usable instructions that, when used by the processor, cause the processor to:
        convert an image containing an icon into arrays of red green blue alpha (RGBA) values;
        determine an area score the icon for each background color;
        determine a border score for the icon;
        divide the image into arrays of RBGA values corresponding to grid squares; and
        determine a grid score for each grid square of the image.

2. The system of claim 1, further comprising determining an array of coordinates for opaque pixels of the icon.

3. The system of claim 2, further comprising excluding all pixels below an opaque alpha threshold.

4. The system of claim 3, further comprising identifying a relative luminance between opaque pixels and a background color.

5. The system of claim 4, wherein the area score is a percentage of identified opaque pixels with the relative luminance above a minimum contrast ratio.

6. The system of claim 5, further comprising determining an array of coordinates of border pixels by finding pixels that are not transparent and an outer pixel or have a transparent neighboring pixel.

7. The system of claim 6, further comprising identifying a relative luminance between opaque border pixels and a background color.

8. The system of claim 7, further comprising providing a border score, the border score being the percentage of identified opaque border pixels with the relative luminance above a minimum contrast ratio.

9. The system of claim 6, wherein pixels that are not transparent are pixels that have an alpha value that is above a transparent alpha threshold.

10. The system of claim 9, further comprising filtering out grid squares that are entirely composed of transparent pixels.

11. The system of claim 10, further comprising, for any remaining grid squares, identifying a percentage of opaque pixels greater than an area threshold.

12. The system of claim 11, further comprising providing a grid score, the grid score being the percentage of grid squares that have the percentage of opaque pixels greater than the area threshold.

13. The system of claim 12, wherein the border threshold, the area threshold, the minimum contrast ratio, the opaque alpha threshold, and the transparent alpha threshold are defined by a user.

14. The system of claim 13, further comprising providing a weight score that provides weights to the number of border pixels compared to area pixels.

15. The system of claim 13, further comprising providing a composite score to a user, the composite score considering the area score, the border score, and the grid score for the icon to evaluate a risk of the icon not being accessible when placed upon the corresponding background color round.

16. A computerized method for providing an icon accessibility tool, the method comprising:
    converting an image containing an icon into arrays of red blue green alpha (RGBA) values;
    determining an area score for the icon for each background color;

determining a border score for the icon;
dividing the image into arrays of RBGA values corresponding to grid squares;
determining a grid score for each grid square of the image; and
providing a composite score to a user, the composite score considering the area score, the border score, and the grid score for the icon to evaluate a risk of the icon not being accessible when placed upon the corresponding background color.

17. The method of claim 16, further comprising:
determining an array of coordinates for opaque pixels of an icon;
excluding all pixels below an opaque alpha threshold;
identifying a relative luminance between opaque pixels and a background color; and
providing an area score, the area score being a percentage of identified opaque pixels with the relative luminance above a minimum contrast ratio.

18. The method of claim 17, further comprising:
determining an array of coordinates of border pixels by finding pixels that are not transparent and an outer pixel or have a transparent neighboring pixel;
identifying a relative luminance between opaque border pixels and a background color; and
providing a border score, the border score being the percentage of identified opaque border pixels with the relative luminance above a minimum contrast ratio, wherein pixels that are not transparent are pixels that have an alpha value that is above an transparent alpha threshold.

19. The method of claim 18, further comprising:
filtering out grid squares that are entirely composed of transparent pixels;
for any remaining grid squares, identifying a percentage of opaque pixels greater than an area threshold; and
providing a grid score, the grid score being the percentage of grid squares that have the percentage of opaque pixels greater than the area threshold.

20. One or more computer storage media having computer-executable instructions embodied thereon that, when executed by a computer, causes the computer to perform operations to provide an icon accessibility tool, the operations comprising:
converting an image containing an icon into arrays of red green blue alpha (RGBA) values;
dividing the image into arrays of RBGA values corresponding to grid squares;
determining an array of coordinates for opaque pixels of an icon;
excluding all pixels below an opaque alpha threshold;
identifying a relative luminance between opaque pixels and a background color;
providing an area score, the area score being a percentage of identified opaque pixels with the relative luminance above a minimum contrast ratio;
determining an array of coordinates of border pixels by finding pixels that are not transparent and an outer pixel or have a transparent neighboring pixel;
identifying a relative luminance between opaque border pixels and a background color;
providing a border score, the border score being the percentage of identified opaque border pixels with the relative luminance above a minimum contrast ratio, wherein pixels that are not transparent are pixels that have an alpha value that is above an transparent alpha threshold;
filtering out grid squares that are entirely composed of transparent pixels;
for any remaining grid squares, identifying a percentage of opaque pixels greater than an area threshold;
providing a grid score, the grid score being the percentage of grid squares that have the percentage of opaque pixels greater than the area threshold; and
providing a composite score to a user, the composite score considering the area score, the border score, and the grid score for the icon to evaluate a risk of the icon not being accessible when placed upon the corresponding background color.

* * * * *

UNITED STATES PATENT AND TRADEMARK OFFICE
CERTIFICATE OF CORRECTION

PATENT NO. : 10,565,739 B2
APPLICATION NO. : 15/858133
DATED : February 18, 2020
INVENTOR(S) : Aaron Noll et al.

Page 1 of 1

It is certified that error appears in the above-identified patent and that said Letters Patent is hereby corrected as shown below:

On the Title Page

(73) Assignee: After "CERNER INNOVATION, INC." please insert --, Kansas City, KS (US)--.

In the Specification

Column 03, Line 29: Please remove "RBGA" and replace with --RGBA--.

Column 03, Line 38: Please remove "RBGA" and replace with --RGBA--.

Column 03, Line 52: Please remove "RBGA" and replace with --RGBA--.

Column 08, Line 36: Please remove "for for" and replace with --for--.

Column 08, Line 45: Please remove "RBGA" and replace with --RGBA--.

Column 08, Line 60: Please remove "for for" and replace with --for--.

Column 09, Line 34: Please remove "for for" and replace with --for--.

In the Claims

Column 10, Line 13: Please remove "RBGA" and replace with --RGBA--.

Column 11, Line 02: Please remove "RBGA" and replace with --RGBA--.

Column 12, Line 06: Please remove "RBGA" and replace with --RGBA--.

Signed and Sealed this
Thirty-first Day of March, 2020

Andrei Iancu
*Director of the United States Patent and Trademark Office*